United States Patent
Phan et al.

(10) Patent No.: US 12,507,163 B2
(45) Date of Patent: Dec. 23, 2025

(54) METHOD TO AUTOMATICALLY SWITCH A SUBSCRIPTION BETWEEN TELECOMMUNICATION NETWORKS

(71) Applicant: THALES DIS FRANCE SAS, Meudon (FR)

(72) Inventors: Ly Thanh Phan, Le Plessis Robinson (FR); Vincent Dany, Aubagne (FR); Jean-François Gros, Marseilles (FR)

(73) Assignee: THALES DIS FRANCE SAS, Meudon (FR)

( * ) Notice: Subject to any disclaimer, the term of this patent is extended or adjusted under 35 U.S.C. 154(b) by 424 days.

(21) Appl. No.: 17/792,431

(22) PCT Filed: Dec. 23, 2020

(86) PCT No.: PCT/EP2020/087801
§ 371 (c)(1),
(2) Date: Jul. 13, 2022

(87) PCT Pub. No.: WO2021/144133
PCT Pub. Date: Jul. 22, 2021

(65) Prior Publication Data
US 2023/0044235 A1   Feb. 9, 2023

(30) Foreign Application Priority Data
Jan. 16, 2020  (EP) ..................... 20305036

(51) Int. Cl.
*H04W 48/18* (2009.01)
*H04W 8/02* (2009.01)
(Continued)

(52) U.S. Cl.
CPC ............. *H04W 48/18* (2013.01); *H04W 8/02* (2013.01); *H04W 8/183* (2013.01); *H04W 84/045* (2013.01)

(58) Field of Classification Search
CPC ....... H04W 48/18; H04W 8/02; H04W 8/183; H04W 84/045; H04W 72/56; H04W 84/042; H04W 8/12
See application file for complete search history.

(56) References Cited

U.S. PATENT DOCUMENTS 9,226,145 B1 * 12/2015 Loman .................. H04W 12/35
9,313,643 B1 *  4/2016 Ghoshal ................. H04W 8/02
(Continued)

FOREIGN PATENT DOCUMENTS

WO     2011161490 A1   12/2011

OTHER PUBLICATIONS

International Search Report (PCT/ISA/210) and Written Opinion (PCT/ISA/237) mailed on May 22, 2021, by the European Patent Office as the International Searching Authority for current International Application No. PCT/US2020/087801—[16 pages].
(Continued)

*Primary Examiner* — Dady Chery

(57) ABSTRACT

Provided is a method for connecting a terminal cooperating with a secure element to a second network, the secure element having a subscription from a first network whilst the secure element is roaming on a third network, the secure element storing the PLMN code of the second network, called second PLMN code, and the PLMN code of the third network, called third PLMN code, the second PLMN code having a higher priority than the third PLMN code in the OPLMN roaming file, the second PLMN having no roaming agreement with the first network nor the third network, and the third network having a coverage that overlaps at least a part of the coverage of the second network, the method comprising, when it is detected that the second network has rejected the attachment request of the terminal.

8 Claims, 5 Drawing Sheets

Figure 3:
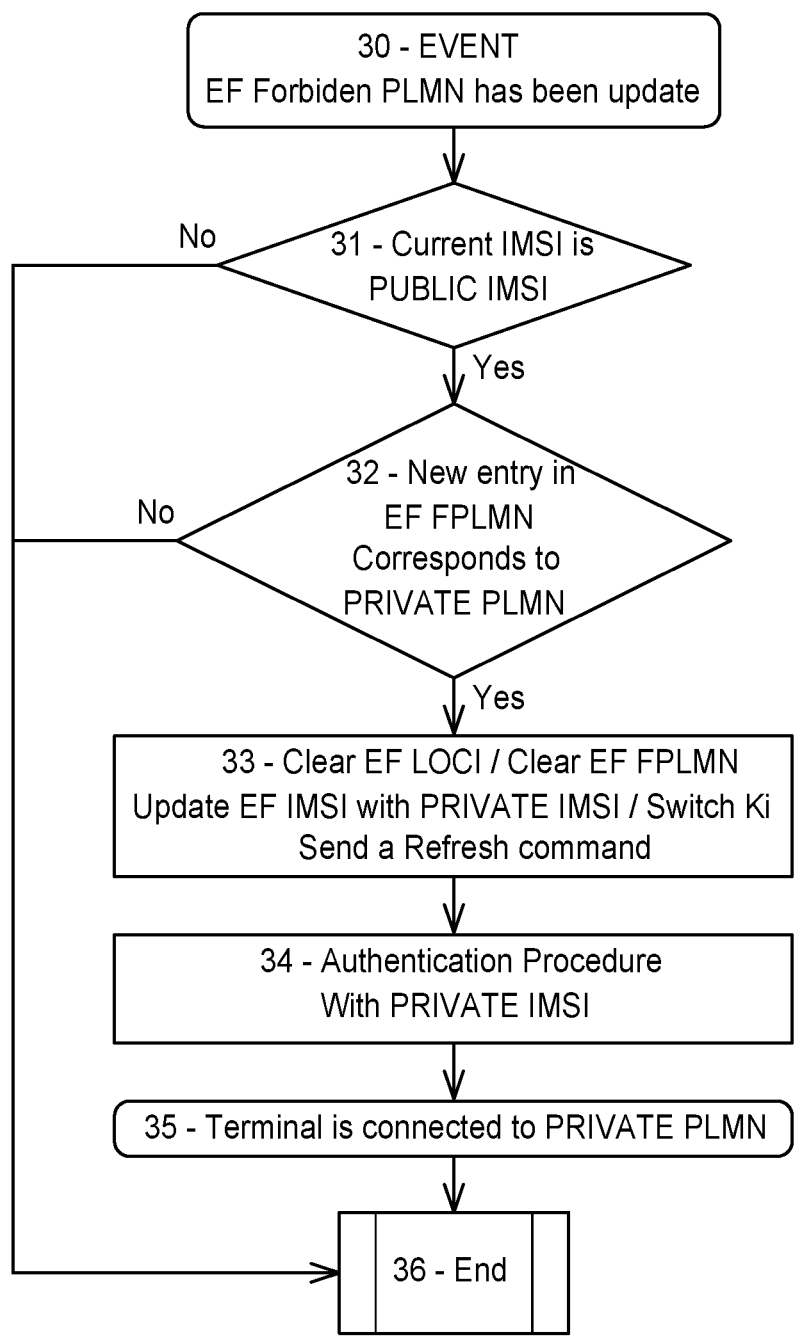

(51) Int. Cl.
*H04W 8/18* (2009.01)
*H04W 84/04* (2009.01)

(56) References Cited

U.S. PATENT DOCUMENTS

| | | | |
|---|---|---|---|
| 2005/0164737 A1* | 7/2005 | Brown | H04W 8/245 |
| | | | 455/558 |
| 2012/0282924 A1* | 11/2012 | Tagg | H04W 48/18 |
| | | | 455/432.1 |
| 2015/0133196 A1* | 5/2015 | Sen | H04W 8/183 |
| | | | 455/558 |
| 2015/0312873 A1* | 10/2015 | Cormier | H04W 88/06 |
| | | | 455/432.1 |
| 2019/0166484 A1* | 5/2019 | Chauhan | H04W 64/00 |
| 2020/0145915 A1* | 5/2020 | Kumar | H04W 76/30 |

OTHER PUBLICATIONS

"3 Generation Partnership Project; Technical Specification Group Services and System Aspects; Service accessibility (Release 17)", 3GPP Standard; Technical Specification; 3GPP TS 22.011, 3rd Generation Partnership, Project (3GPP); vol. SA WGI, No. V17.0.0; Dec. 20, 2019; pp. 1-34; XP051840794, Retrieved from the Internet: URL:ftp://ftp.3gpp.org/Specs/archive/22_series/22.011/22011-h00.zip 22011-h00.doc, [retrieved on Dec. 20, 2019]; the whole document.

\* cited by examiner

Fig. 1

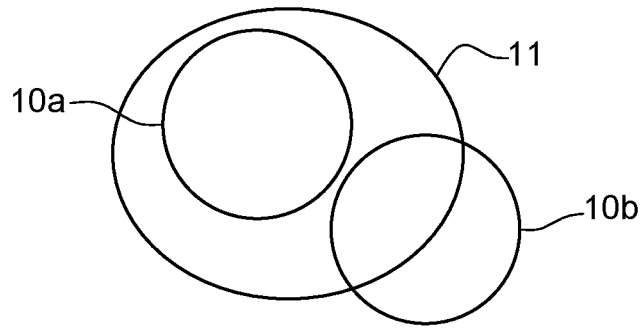

Fig. 2

| 20. The ME attempts to register to the registered PLMN (LOCI files) |
|---|

| 21. The ME attempts to register to the HPLMN. It can be:<br>    PLMN defined in IMSI file if no EHPLMN or empty file<br>    PLMN defined in EHPLMN in priority order if the file exists and is filled |
|---|

| 22. The ME attempts to register according to the User Preferred Network List PLMNwAct stored on the secure element in priority order |
|---|

| 23. The ME attempts to register according to the operator Preferred Network List OPLMNwAct stored on the secure element in priority order |
|---|

| 24. Attempts to register to a network based on radio signal |
|---|

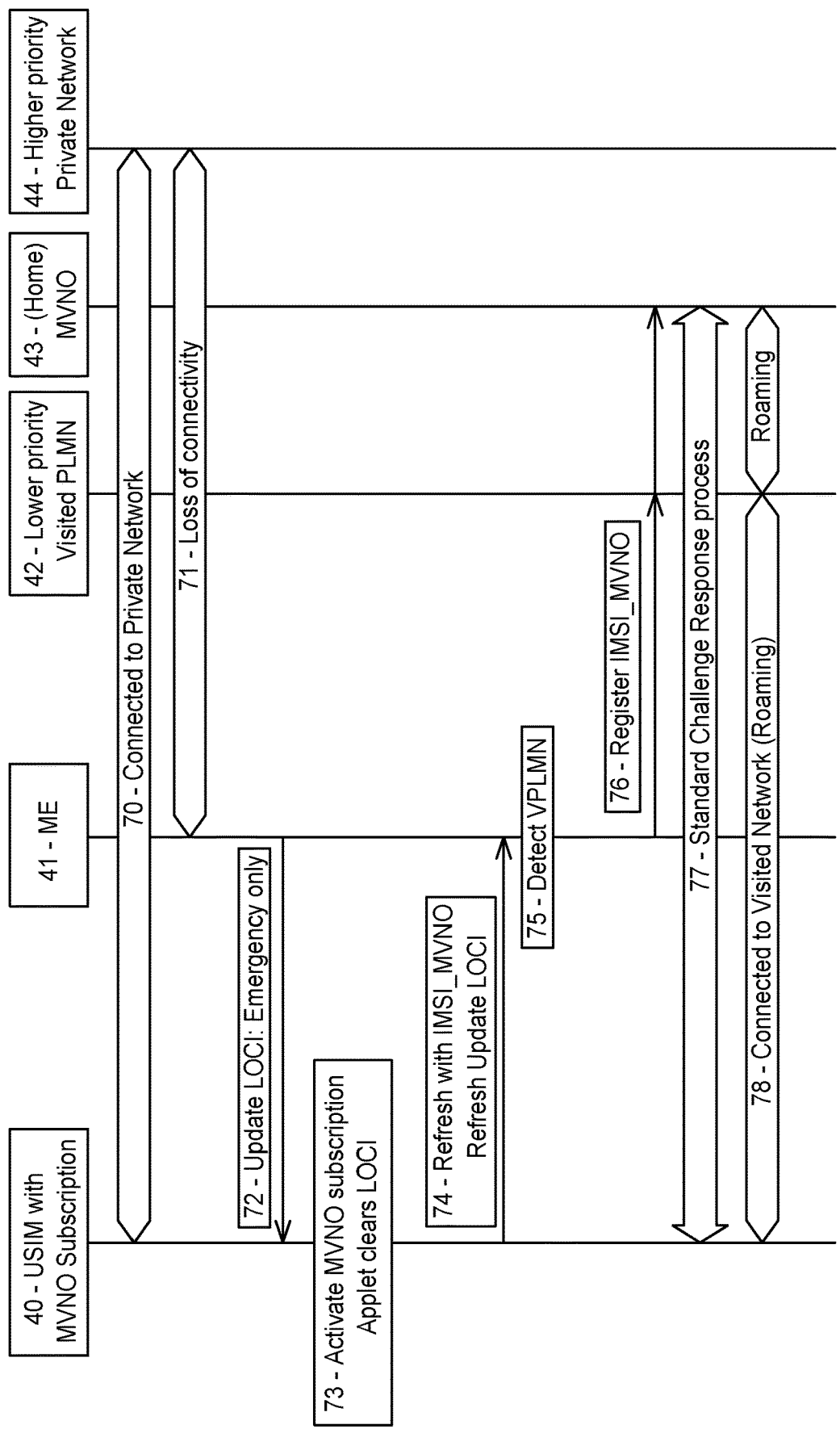

METHOD TO AUTOMATICALLY SWITCH A SUBSCRIPTION BETWEEN TELECOMMUNICATION NETWORKS

The present invention relates to telecommunications and particularly to secure elements (USIMs in particular) collaborating with mobile terminals to access mobile telecommunication networks. These mobile telecommunication networks can be of 2G, 3G, 4G or 5G generations.

The problem addressed by the present invention is to automatically switch from a public network subscription to a private network subscription while the mobile terminal is still attached to the public network.

A private network is typically:
- A telecommunication network reserved for a ministry (for example the ministry of interior of a country). All employees (and only them) of the ministry have access to this network;
- A tactic bubble (tactical network) that can be deployed in case of emergency (terrorist attack for example). The private network is then a IOPS (Isolated E-UTRAN Operation for Public Safety) network that can be accessed by the rescue members, police, . . . . The entire network is comprised in a portable wallet. In response to the growing demand in the public safety community for broadband communication systems, LTE is currently being adopted as the base technology for next generation public safety networks. In parallel, notable efforts are being made by the 3GPP to enhance the LTE standard in order to offer public safety oriented services. In the recent Release 13, the Isolated E-UTRAN Operation for Public Safety concept was introduced. IOPS aims at maintaining a level of communication between public safety users, offering them local mission-critical services even when the backhaul connectivity to the core network is not fully functional. Isolated operation is usually needed in mission-critical situations, when the infrastructure is damaged or completely destroyed, and in out of coverage areas.
- A network belonging to a private company that uses cellular communication for his employees instead of WiFi. This can be the case for an airport for example or a big company.

In all these cases, a particular MNC code (Mobile Network Code) is affected to the subscribers. The MNC code is comprised in the IMSI (International Mobile Subscription Identifier) of the secure element (IMSI=MCC/MNC/MSIN).

Private networks have limited geographic coverage and there is a need to leverage coverage of public networks when the terminal (typically a smartphone or a M2M device) goes out of coverage of the private network.

This is represented in FIG. 1 that shows a private network 10a comprised entirely in a public network 11. The private network (as referenced now by 10b) can also be only partially covered by the public network 11. But private networks always need to be used when available. It is a purpose of the invention to be able to switch automatically from a public to a private network, and vice versa, depending on the availability of the private network:
- When on private network: Switch to an available public network if the private network is no more available;
- When on public network: Switch to the private network when private network is available again, even if the terminal is still under the public network coverage.

The constraints are however the followings:
- There is no inter-connections and roaming agreements between public and private networks, so the users of a private network have to change their secure elements (typically SIM cards or extractible UICCs) in order to connect to a public network or to a private network;
- For the terminals: There is often no dual UICC, the OS can be different from one terminal to another, and the device can be a M2M device or a consumer device.

So the problem is to find a solution permitting to switch automatically from one network to the other (more precisely from public to private).

3GPP has defined roaming mechanisms between networks that rely on the information exchanged between the serving networks (where the User Equipment (UE) or Mobile Equipment (ME) is roaming) and the home network which is able to authenticate the UE/ME.

This mechanism is described in 3GPP TS 22.011 V15.5.0 (2018-09) and represented in FIG. 2 (Automatic network selection mode).

In this figure, at step 20, the ME attempts to register to the registered PLMN (Public Land Mobile Network) by scanning the EF_LOCI file.

At step 21, the ME attempts to register to the HPLMN (Home PLMN).

This HPLMN can be a PLMN defined in the EF_IMSI file if there is no EHPLMN (Equivalent HPLMN) file or if this file is empty. EHPLMN stands for Equivalent HPLMN (Home PLMN). It contains the list of PLMNs which can be regarded as a Home PLMN. The items are listed in order of decreasing priority, meaning that the first PLMN in the list has the highest priority and the last item has the lowest priority.

A PLMN is defined in the EHPLMN file in priority order if this EHPLMN file exists and is not empty. "Priority order" means that the ME will in priority choose the PLMN that is listed first in the EHPLMN file, this file being the preferred one.

At step 22, and if step 21 is not successful, the ME attempts to register according to the User Preferred Network List. For this purpose, it scans the PLMNwAct list of the secure element in priority order. PLMNwACT stands for 'User Controlled PLMN with Access Technology'. This parameter contains the list of (PLMN, Access Technology) pairs. This information is determined by the user and defines the preferred PLMNs of the user in priority order.

These PLMNs are listed in decreasing order of priority, meaning the first PLMN has the highest priority. This parameter plays important roles to determine which PLMN should be selected first under various cell selection, reselection test.

At step 23, and if step 22 is not successful, the ME attempts to register according to the operator preferred network selection. For that, it scans the OPLMNwAct list stored in the secure element in priority order. OPLMNwACT stands for Operator controlled PLMN selector with Access Technology. This parameter is set by Network Operator. This is where a network operator puts other networks with which it has a roaming agreement. This parameter contains a list of (PLMN, Access Technology) pairs. These PLMNs are listed in decreasing order of priority, meaning the first PLMN of the list has the highest priority, the second PLMN of the list has a lowest priority than the first PLMN and a higher priority than the third PLMN of the list and so on.

Finally at step 24, if step 23 is not successful, the ME attempts to register to a network based on the strongest received signal.

A device connected to a visited network (meaning not connected to a PLMN defined by IMSI or PLMN listed in EHPLM) shall make periodic attempts to look for a higher priority PLMN following the selection mode described here above (from step 21). The interval between attempts is n×6 minutes where n is defined in the EF HPPLMN file.

However, in private networks deployment (e.g. ad hoc telecommunication networks or IOPS networks) there is no inter-connections and roaming agreements between the private network and another network.

The technical problem to be solved is therefore to provide a solution to:
Select the adequate subscription,
Without intervention of the mobile user and
that could be easily deployed by the service provider.

The present invention focuses on the case where the service provider offers the services with different subscriptions which have distinct subscription identifiers (different IMSI, different long term keys Ki).

The alternatives of the proposed solution are:
Switch from a private network to a public network when there is a loss of connectivity: The loss of connectivity event to the private network may be detected, and the detected event is used to switch the IMSI value from private network IMSI value to a public network IMSI value;
Switch from a public network to a private network: When on public network it is possible to track the localization of the device and when the device/terminal is in a location where the private network should be available, then it is possible to switch to the private network.

The problem is that the location of the private network needs to be known in advance by the device (pre-configured in the device), however localization and availability of the private network information cannot always be known by the public network. So switching may occur although the private network is not available.

In most public safety cases, for instance, it is not possible to know in advance where the tactical communication bubble will be present, thus localization of the tactical bubble cannot be provided. The invention proposes a solution to these problems.

More precisely, the present invention proposes a method for connecting a terminal cooperating with a secure element to a second network, the secure element having a subscription from a first network whilst the secure element is roaming on a third network, the secure element storing the PLMN code of the second network, called second PLMN code, and the PLMN code of the third network, called third PLMN code, the second PLMN code having a higher priority than the third PLMN code in the OPLMN roaming file, the second PLMN having no roaming agreement with the first network nor the third network, and the third network having a coverage that overlaps at least a part of the coverage of the second network, the method comprising, when it is detected that the second network has rejected the attachment request of the terminal:
a—Storing in the EF_IMSI file an IMSI, called second IMSI, from the second network and allocating the associated key Ki to this second IMSI;
b—Sending from the secure element to the terminal a Refresh command;
c—Launching an authentication procedure with the second IMSI and the associated key Ki in order to connect the terminal to the second network.

Preferably, the first network is a MVNO network.
Advantageously, the second network is a private network.

The third network is preferably the network of a public network with which the terminal is in roaming with the IMSI of the first network.

Advantageously, the EF_FPLMN file is cleared after step -a-.

Preferably, the EF_LOCI file of the secure element is cleared after step -a-.

Advantageously, the detection that the second network has rejected the attachment request of the terminal is the fact that second PLMN code is stored in the EF_FPLMN file.

In an alternative, the detection that the second network has rejected the attachment request of the terminal is the reception of a NETWORK_REJECTION event from the terminal.

Figure 4:
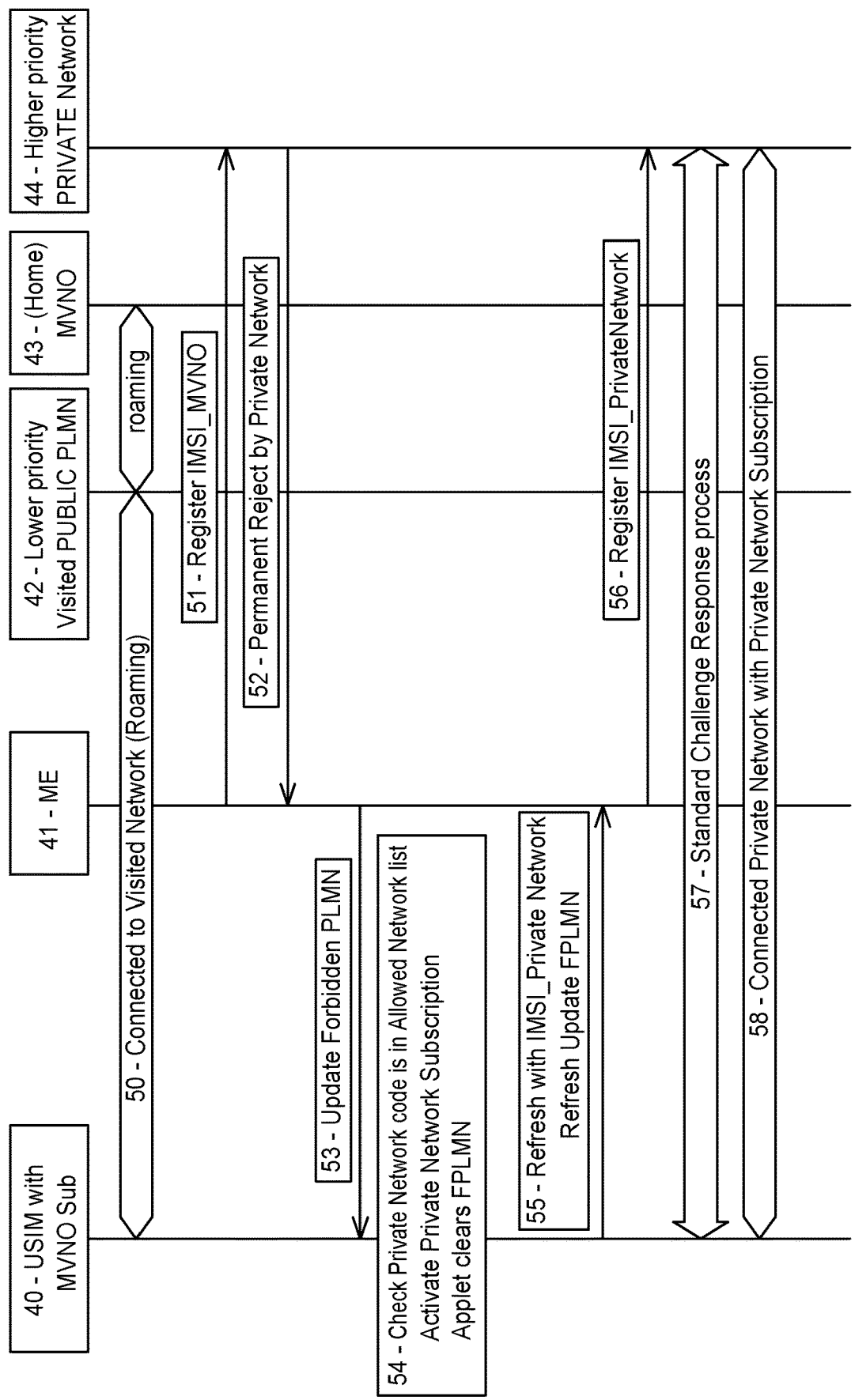
Figure 5:
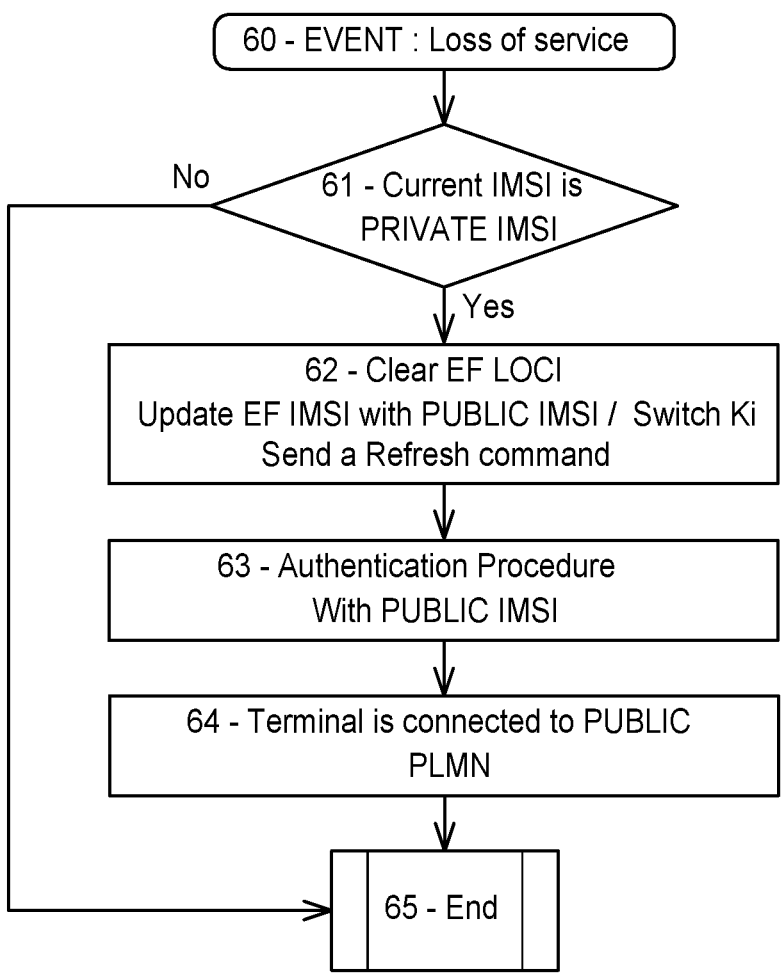

The invention will be better understood by reading the following description of a preferred embodiment of the invention in regard of the figures that represent:

FIG. 1 radio coverages of a public and two private networks;

FIG. 2 the automatic network selection mode as defined in TS 22.011;

FIG. 3 a flowchart of the steps of the method according to the invention for switching from a public to a private network subscription;

FIG. 4 the messages exchanged for the flowchart of FIG. 3;

FIG. 5 a flowchart of the steps of the known method for switching from a private to a public network subscription (known method);

FIG. 6 the messages exchanged for the flowchart of FIG. 5 (known method).

FIGS. 1 and 2 have been described in regard of the state of the art.

FIG. 3 represents a flowchart of steps of an example of the method according to the invention for switching from a public to a private network subscription.

This configuration private/public is only done as an example, the invention being also applicable to only public networks as it will be understood hereinafter.

The assumptions are here the followings:
There are three networks to be considered:
A first network of a MVNO (Mobile Virtual Network Operator) with a corresponding first PLMN code (and the secure element stores the corresponding IMSI (first IMSI) and long term key Ki (first Ki));
A second network of a private MNO (Mobile Network Operator) with a corresponding second PLMN code (and the secure element stores the corresponding IMSI (second IMSI) and long term key Ki (second Ki));
A third network of a public MNO on which the terminal is in roaming with the first IMSI and corresponding first Ki.

The third network is the one of a public MNO that owns the infrastructure (base stations, HLR, VLR, back-end system, . . . ) permitting to the user to roam with the first IMSI/Ki of his MVNO in the network of the third public MNO. There is a roaming agreement between the MVNO and the public MNO (like for example between NRJ Mobilem and Orangem in France). In particular, there is information exchanged between the HLR of the first network of the MVNO and the third network of the public MNO during the authentication process of the device to the third network. In contrast, there are no roaming agreements between the second network owner (private network) and the first network owner (MVNO) nor the second network and the third network (public MNO). In particular, there is no information exchanged during the authentication process of the device to the second network (private network) between the second network and neither first nor third networks. The MVNO (the first MNO) has no radio coverage at least overlapping the radio coverage of the private network (second MNO).

The secure element has thus a subscription from the first network and is roaming on the third network. The secure element stores the second network's PLMN code and the third network's PLMN code in the OPLMN roaming file (EF_OPLMN). The second network's PLMN code has a higher priority than the third network's PLMN code, i.e. the secure element will select the second PLMN in priority (compared to the third PLMN).

This means that the EF_OPLMN file contains:
1 priority: Private network (second network) PLMN code
2 priority: Public network (third network) PLMN code As represented in FIG. 1, the third network has a coverage including at least a part of the coverage of the second network.

In a first step, the terminal has lost his connectivity with the second network (with its private MNO). The user of the terminal has left the zone 10a or 10b of FIG. 1 and entered in the coverage of zone 11. The coverage of zone 11 is that of the third MNO (the public network). At this stage, the user is in roaming situation (connected on the radio of the third MNO with the credentials (IMSI/Ki) of his MVNO (first network).

If the user enters again in the zone 10a or 10b covered by the second network (his private network), the terminal will attempt to attach to the private network (second PLMN) because it has a higher priority in the OPLMN roaming file compared to the public network (third network), but this second network will reject (after maximum nx6 minutes, depending on the value n stored in the EF_HPPLMN file), the attachment request sent by the terminal. This is because the credentials used by the terminal are those of the first network (MVNO), unknown by the second network (private network).

At such an occurrence, the invention proposes to:
a—Store in the EF_IMSI file the second IMSI from the second PLMN and allocate the associated key Ki of this second IMSI;
b—Send from the secure element to the terminal a Refresh command;
c—Launch an authentication procedure with this second IMSI and the associated key Ki in order to connect the terminal to the second network.

The terminal is then connected again to his private network.

The detection that the second network has rejected the attachment request of the terminal can be the reception of a NETWORK_REJECTION event from the terminal.

Another way to detect such a rejection is the fact that the second PLMN code has been stored in the EF_FPLMN file. This is represented in FIG. 3.

At step 30, an event is detected by the secure element. This event can occur whenever the EF (Elementary File) of the FPLMN (Forbidden PLMN) list has been updated. The EF FPLMN update event is the starting point for this flowchart. Because the secure element is in roaming (national or international), the terminal shall make periodic attempts to look for a higher priority PLMN network. The period is a multiple (n) of 6 minutes. The number n is stored in EF_HPPLMN file.

At step 31, the secure element checks if the current IMSI used for attaching the secure element to the current network is an IMSI of a public network. If no, the process ends (step 36). If yes, the secure element checks (step 32) if the new entry in the EF FPLMN file corresponds to his private PLMN. If no, the process ends (step 36). If yes, this means that the secure element is under his private network coverage. If the private network is detected by the terminal, the terminal shall try to register to it because it is #1 in the EF_OPLMN file.

At step 33, the secure element clears the EF_LOCI and EF_FPLMN files (facultative steps). It updates also the EF_IMSI file with the private IMSI of the secure element and switches the long term key Ki corresponding to this private IMSI. The secure element also sends a Refresh command to the terminal.

At step 34, the terminal tries to connect to the detected private network and establishes an authentication procedure with this private network IMSI and the corresponding key Ki.

At step 35, the terminal/secure element is connected to its private PLMN. The process then ends (step 36).

FIG. 4 represents the messages exchanged for the flowchart of FIG. 3.

In this figure, the actors are:
A secure element (USIM 40) comprising a subscription with a MVNO;
A mobile equipment/terminal ME 41;
A visited public PLMN 42 having a priority (as defined in EF_OPLMN file) with a lower priority than the Private network 44;
A MVNO 43.

In a first step 50, the USIM 40 is connected to his MVNO 43 in roaming through the visited public PLMN 42.

In a further step 51, the ME 41 enters the coverage of the private network 44. The ME then tries to attach to this network 44 by using the current IMSI (the IMSI of the MVNO 43). But the private network 44 does not recognize this MVNO IMSI and rejects (step 52) the attachment request permanently. A rejection message is then sent to the ME 41 that updates (step 53) the list of the FPLMN in the USIM 40 (EF_FPLMN file).

At step 54, a dedicated feature (can be in the form of an applet) of the USIM 40:
Checks if the private network code is in an allowed network list (this is the case);
Activates the private network 44 subscription (IMSI from private network and corresponding Ki);
Clears the EF_FPLMN file (optionally).

The USIM then (step 55) sends a Refresh command to the ME 41 in order to ask for a registration (step 56) with the private network 44, using the newly activated private network 44 subscription. After a challenge/response process 57, the USIM is connected to the private network 44 (step 58).

FIG. 5 is a flowchart showing how in the state of the art a switch is done between a private and a public network when a user of a terminal gets out of the coverage of his private network.

In this figure, at step 60, the terminal cooperating with the secure element detects a loss of service from the private network. The secure element then (step 61) checks if the currently used IMSI is the IMSI of the private network. If no, the process ends (step 65). If yes, at step 62, the secure element clears the EF_LOCI file, updates the EF_IMSI file with the public IMSI and switches the Ki to the Ki associated to the public IMSI and sends a Refresh command to the terminal. The terminal then (step 63) tries to authenticate to the public network by using this public IMSI (and the associated Ki) and at step 64 the terminal is connected to the public PLMN. The process then ends (step 65).

FIG. 6 represents the messages exchanged for the flowchart of FIG. 5.

The actors are the same as in FIG. 4.

At step 70, the secure element 40 is connected with his private network 44. When getting out of coverage of this private network, a loss of connectivity between the ME 41 and the private network 44 is detected (step 71). The ME 41 then updates the EF_LOCI file for allowing only emergency calls (step 72). At step 73, the secure element 40 activates its MVNO subscription and an applet clears the EF_LOCI file. At step 74, the secure element 40 sends a Refresh command to the ME 41.

At step 75, the ME 41 detects that it is under coverage of the VPLMN 42 and tries (step 76) to register to the MVNO 43 through the public network 42 with the corresponding IMSI. After a challenge/response process (step 77), the USIM 40 is connected to his MVNO 43 through the public network 42.

The invention applies when the first network is the one of a MVNO but also more generally when the first network is the network of a MNO with which the third network has roaming agreements with (national or international), the important point being that when leaving the second network (private) radio coverage, the ME enters in roaming situation. This will allow the consultation of the EF_OPLMN file.

A service provider can own the MVNO. This service provider has a specific PLMN code to provide connectivity services to private network users leveraging connectivity coverage from public networks, while having roaming agreement with local public networks. Higher priority is always given to private networks.

When using a service provider (MVNO) subscription, the users are always roaming on partner's public networks. Thus, the user equipment (terminal) will always automatically select higher priority roaming partner networks when available i.e. gives higher priority to a private network in the OPLMN file in this invention.

Based on network response (error codes) to Registration requests, the terminal will switch to corresponding private network subscription or use the service provider (MVNO) subscription.

The invention enables to switch automatically from one network to another but always by putting the highest priority on the private network.

It leverages roaming mechanism where the mobile equipment scan the availability of a network with higher priority (private network in this case).

It does not need any:
extra component generating cost (e.g. dual SIM);
specific device feature limiting the targeted services (e.g. specific OS);
or any manual action discarding to target M2M devices.

The invention claimed is:

1. A method for connecting a terminal cooperating with a secure element to a second network, said method comprising steps of:
   Detecting that said second network has rejected an attachment request of said terminal;
   a—Storing in a EF_IMSI, Elementary File_International Mobile Subscription Identifier, file an IMSI, International Mobile Subscription Identifier, called second IMSI, from said second network and allocating an associated key Ki to this second IMSI;
   b—Sending from said secure element to said terminal a Refresh command; and
   c—Launching an authentication procedure with said second IMSI and said associated key Ki in order to connect said terminal to said second network,
   wherein;
   said secure element has a subscription from a first network,
   said secure element is roaming on a third network,
   said secure element stores:
      a PLMN, Private Land Mobile Network, code of said second network, called second PLMN code, and
      a PLMN code of said third network, called third PLMN code,
   said second PLMN code has a higher priority than said third PLMN code in a OPLMN, Operator Private Land Mobile Network, roaming file,
   said second PLMN has no roaming agreement with said first network nor said third network, and
   said third network has a coverage that overlaps at least a part of the coverage of said second network.

2. The method according to claim 1 wherein said first network is a MVNO, Mobile Virtual Network Operator, network.

3. The method according to claim 1 wherein said second network is a private network.

4. The method according to claim 1 wherein said third network is the network of a public network with which said terminal is in roaming with the IMSI of said first network.

5. The method according to claim 1 wherein an EF_FPLMN, Elementary File_Forbidden Private Land Mobile Network, file of said secure element is cleared after step -a-.

6. The method according to claim 5 wherein an EF_LOCI, Elementary File_Location Information, file of said secure element is cleared after step -a-.

7. The method according to claim 1 wherein the detection that said second network has rejected the attachment request of said terminal occurs when a second PLMN code is stored in the EF_FPLMN file.

8. The method according to claim 1 wherein the detection that said second network has rejected the attachment request of said terminal occurs upon reception of a NETWORK_REJECTION event from said terminal.

* * * * *